(12) United States Patent
Brown (10) Patent No.: US 6,331,993 B1
(45) Date of Patent: Dec. 18, 2001

(54) DIODE-PUMPED GAS LASERS (76) Inventor: David C. Brown, R.R. #1, Box 356J, Brackney, PA (US) 18812

( * ) Notice: Subject to any disclaimer, the term of this patent is extended or adjusted under 35 U.S.C. 154(b) by 0 days.

(21) Appl. No.: 09/238,450

(22) Filed: Jan. 28, 1999

Related U.S. Application Data (60) Provisional application No. 60/072,899, filed on Jan. 28, 1998.

(51) Int. Cl.⁷ ....................................................... H01S 3/22
(52) U.S. Cl. .................................. 372/55; 372/70; 372/75; 372/71
(58) Field of Search .................................. 372/55, 70, 75

(56) References Cited

U.S. PATENT DOCUMENTS

| | | | |
|---|---|---|---|
| 4,426,706 | * | 1/1984 | Liu .......................................... 372/86 |
| 5,311,529 | * | 5/1994 | Hug ......................................... 372/35 |
| 5,379,315 | * | 1/1995 | Meinzer .................................. 372/55 |
| 5,946,337 | * | 8/1999 | Govorkov ............................... 372/92 |

* cited by examiner

Primary Examiner—Teresa M. Arroyo
Assistant Examiner—Gioacchino Inzirillo
(74) Attorney, Agent, or Firm—Alix, Yale & Ristas, LLP (57) ABSTRACT

A diode-pumped gas laser includes a source of optical diode-pumping light and a gas cell having a first optical window for receiving the diode-pumping light. The gas cell contains a laser gas including a lasing gas comprised of at least one absorbing and lasing atomic or molecular gas. The lasing gas has an optical absorption band which is at least partially overlapped by the bandwidth of the diode-pumping light. The gas laser also includes a gas laser resonator for providing an output laser beam which is emitted from the gas cell via a second optical window. The output laser beam has one or more laser wavelengths. The gas laser may also include diode optics for directing the diode-pumping light through the first optical window and a heat power regulation system for regulating the temperature of the source of optical diode-pumping light.

27 Claims, 8 Drawing Sheets

DIODE-PUMPED GAS LASERS

This application claims benefit of Provisional Application 60/072,899 filed Jan. 28, 1998.

BACKGROUND OF THE INVENTION

This invention relates generally to diode pumped gas lasers that are end-pumped. More particularly, the present invention relates to the use of modern semiconductor laser diode sources to optically pump gas atoms or molecules that can produce visible, near-infrared (NIR), mid-infrared (MIR), and far-infrared (FIR) laser transitions.

The definition of "gas" includes a single gas or a mixture of atomic and/or molecular gases, and atomic and molecular vapors. It has been known for some time that triatomic molecules, for example, can be optically rather than electrically-pumped. Because the diode wavelengths needed to demonstrate efficient optical pumping of $CO_2$ and $N_2O$ fall in the NIR to MIR range, such sources have not heretofore been available. High power laser diodes available today have wavelengths ranging from about 635 nm in the red to about 1.6 $\mu$m in the NIR, although lower power semiconductor diodes can now be obtained commercially out to about 2 $\mu$m.

Recently a new type of semiconductor diode laser known as the quantum cascade diode laser has been demonstrated with output in the 3–15 $\mu$m range which is ideal for pumping a number of triatomic molecule based lasers including $CO_2$ and $N_2O$. NIR emitting diode lasers can also be used to optically pump a number of diatomic molecules, including HF, DF, HCl, HBr, and CO. Recently developed GaN semiconductor diode lasers have extended the emission range down to just above 400 nm in the near-ultraviolet or blue spectral region, making possible the demonstration of visible and NIR laser emission from atomic or molecular gases. Optical pumping of molecular iodine vapor has been demonstrated where pumping at 493–501 nm resulted in emission at 1.315 $\mu$m; this system for example is amenable to pumping using a semiconductor laser diode or diode array.

Semiconductor diode-pumping of atomic and molecular gas lasers can produce a number of substantial benefits, including producing new laser transitions that heretofore could not be achieved by pumping with electrical discharges, higher laser efficiency as compared to electrical discharge lasers, and substantially less heating of the lasing media than that obtained with electrical discharges. Other substantial advantages include the use of low-voltages rather than the lethal high-voltages associated with present electrical discharge lasers, the elimination of gas dissociation which limits the lifetime of present gas lasers, reduced electric noise, and the elimination of discharge instabilities which lead to fluctuations in the laser output. Also, because there are no electrical discharge imposed limitations to the partial pressures involved, higher gain/cm can be achieved. Reduced heating of the gas will also improve the gain/cm. Because the large power supplies and associated equipment used for electrical discharges can be eliminated with diode-pumping, more compact laser sources will result. Because of the elimination of discharge instabilities and the precision with which the output of diode lasers can be regulated, very low-noise stable diode-pumped gas lasers can be demonstrated.

A substance is optically-pumped if it has an optical absorption band that absorbs a fraction or all of the incident optical radiation whose wavelength or bandwidth center is completely or partially overlapping with the absorption band of the substance. In one method, the absorption of optical photons had the effect of raising ground state or excited state electrons in the substance to an excited state or higher excited state, respectively, for the purpose of achieving a population inversion in the substance. In another method, the absorption of photons is used to excite or populate an excited state in a first atom or molecule and the excitation is then transferred to a second atom or molecule whose upper laser level is near or below the energy level in the first atom or molecule. In yet another method, the absorption of a photon is used to photo-dissociate a first molecule into excited atoms with a populated upper laser level. Such a population inversion is well known to those familiar with the state-of-the-art of laser technology. In general, the number of excited ions/$cm^3$ or excitation density $R_e(r,z)$ can be calculated from $$R_e(r,z,t) = \frac{\alpha_p(\lambda_p)\lambda_p}{hc} I(r,z,t)$$

where $\lambda_p$ is the pump or diode wavelength, h Planck's constant, c the speed of light, l(r, z, t) the incident diode intensity which in general is a function of the radial r and azimuthal (propagation direction) z coordinates and time t. $\alpha_p$ is the monochromatic absorption coefficient, used in calculating the absorption of the intensity according to $$I(r,z,t)=I_0(r,t)\exp(-\alpha_p z).$$

The absorption coefficient is calculated from $$\alpha_p(\lambda_p)=\sigma_p(\lambda_p)n_D$$

here $\sigma_p(\lambda_p)$ is the pump absorption cross-section which is a function of the pump wavelength, and $n_D$ is the absorbing species density. Note that the above equations are for an assumed monochromatic pumping or diode source; in cases where the source has an appreciable bandwidth the equations can easily be suitably modified. It is important to note that the equation in line 11 predicts that the pump light, and therefore the excitation density according to the equation in line 6, vary exponentially with penetration distance into the absorbing gas medium. This of course also means that the inversion density and gain also vary exponentially with distance. For end-pumped diode-pumped gas lasers, in analogy with diode-pumped solid-state lasers, the inversion and gain vary substantially with penetration distance and thus the obtained profiles are very inhomogeneous. This is in contrast to the pumping methods disclosed by Meinzer (U.S. Pat. Nos. 5,506,857 and 5,379,315) which disclose a "homogeneous excited medium" (U.S. Pat. No. 5,506,857, claim 1, line 17) or "said pumping light being injected relatively uniformly into said gas." (U.S. Pat. No. 5,379,315, claim 1, Line 13) In addition, since the diode-pump sources from single diodes, diode-arrays, or from diodes coupled through fibers often vary transversely with a Gaussian or Gaussian-like distribution, the resulting inversion density and gain in the diode-pumped gas laser will also show strong variation with both the transverse and distance (longitudinal) coordinate. Again in analogy to diode-pumped solid-state lasers, this feature makes it possible to pump directly into the fundamental $TEM_{00}$ Gaussian resonator mode and achieve single transverse mode output with very good overlap between the pump and the resonator modes. A large overlap efficiency results in large extraction and overall laser efficiency. For direct excitation, and in the absence of lasing, the absorption of diode light produces an upper level inversion density $n_m$ whose variation with time t is given by the equation $$\frac{dn_m}{dt} = R_e - \frac{n_m}{\tau_F} - k_Q n_m$$

where $\tau_F$ is the upper level fluorescence lifetime and all other processes that depopulate the upper laser level, such as collisional de-excitation, are lumped into a single quenching constant $k_Q$. The lower laser or terminal laser level in general has a population $N_T$ that is, in the case of four-level lasers or quasi-four level lasers, insignificant as compared to the upper laser level. The primary reason for this is that the lifetime of the terminal level, $\tau_T$, is significantly less than the fluorescence or effective lifetime of the upper laser level. The gain/cm $g_0$ of the laser transition is given most generally by $$g_0 = \sigma_e(n_m - (g_2/g_1)n_T)$$

here $\sigma_e$ is the transition effective stimulated-emission coefficient and $g_2$ and $g_1$ are the upper and lower laser level degeneracy's respectively. To achieve net positive gain, one must then have $$n_m > (g_2/g_1)n_T$$

Once such a population inversion is achieved and is able to overcome the laser resonator threshold, power in the form of a laser output beam can be extracted from the substance using optical resonators. Optical pumping may be implemented by the use of incoherent sources, for example flash lamps, the sun, and various types of explosives, or coherent sources, for example lasers (i.e. a laser-pumped laser) and semiconductor diode lasers. In some instances optical pumping sources are partially coherent as is obtained with a laser diode array whose individual emitters are coherent but whose total output is partially coherent or completely incoherent.

The use of optical-pumping to create a population inversion in a lasing medium is well-established. Flash lamps and diode lasers have both been successfully used to create population inversions and demonstrate laser output in solid-state lasers. Noble gas flash lamps such as Xe, Kr, or mixtures of Xe and Kr have been used for many years. Other flash lamp or electrical discharge or filament sources include Ce lamps, Na lamps, and tungsten filament lamps. For gas lasers, electrical discharges are widely used to excite electrons from a ground state to an excited state or from an excited state to a higher excited state. A key point with electrical discharge gas lasers is that little selectivity is achieved since all gas energy levels accessible via the discharge plasma electrons are populated to a certain degree. Because energy levels other than those directly involved in the lasing process are populated, a significant amount of waste heat is generated and overall laser efficiency suffers. In contrast, optical pumping with monochromatic or narrow bandwidth sources such as semiconductor diode lasers allows only a selected energy level or band to be populated, minimizing heating losses.

The primary reason why gas lasers have not benefitted from the advent of high-power semiconductor diode sources is that until recently such sources were not available at a wavelength suitable for pumping important gas laser transitions. GaAlAs laser diodes and laser diode arrays are currently available with output between about 780–860 nm, while InGaAs laser diodes can be obtained in the range of 940–1100 nm. In recent years AlGaInP diode lasers with output in the visible region (630–690 nm) have begun to be offered commercially, and more recently InGaAsP diode lasers have been offered commercially with substantial output power in the 1.5–1.6 $\mu$m and 1.8–1.96 $\mu$m ranges, the latter representing the longest wavelength laser diode commercially available. Substantial progress has been reported recently in producing short wavelength blue laser diodes with output close to 400 nm, while newer quantum cascade semiconductor diode laser technology under development can provide wide spectral coverage in the MIR region from 3–15 $\mu$m.

SUMMARY OF THE INVENTION

Briefly stated, the invention in a preferred form is an end-pumped diode-pumped gas laser which includes a source of optical diode-pumping light and a gas cell having a first optical window for receiving the diode-pumping light. The gas cell contains a laser gas including a lasing gas having at least one absorbing and lasing atomic or molecular gas. The lasing gas has an optical absorption band which is at least partially overlapped by the bandwidth of the diode-pumping light. The gas laser also includes a gas laser resonator for providing an output laser beam which is emitted from the gas cell via a second optical window. The output laser beam has one or more laser wavelengths. The gas laser may also include diode optics for directing the diode-pumping light through the first optical window and a heat power regulation system for regulating the temperature of the source of optical diode-pumping light.

An object of this invention is to provide gas medium lasers that are semiconductor diode pumped, whose gas may be static or flowing in a closed loop system incorporating provision for gas cooling or heating, and whose pressure and composition may be adjusted for optimum laser performance. Lasing systems containing a single lasing gas, or a system containing a lasing gas and one or more inert gases are included in this invention. Similarly, gas lasers that incorporate an absorbing gas whose excited state energy is transferred to a closely lying or lower energy level in a second gas, creating a population inversion in the second gas, are also included, as are atomic and molecular vapors with or without an inert gas or gases. We also include atomic dissociation lasers.

It is a further object of this invention to provide implementations that allow end diode-pumped lasers with low, medium, or high average power to be demonstrated. Fundamental to achieving this power output flexibility is the ability to "scale" the laser output by simply increasing or decreasing the power or size of the available diode-pumping source.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings wherein like numerals represent like parts throughout the several figures and in which.

DETAILED DESCRIPTION OF THE PREFERRED EMBODIMENT

Figure 1:
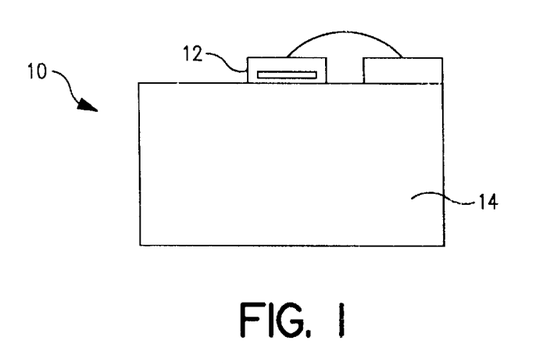
FIG. 1 is a schematic view of a single diode mounted to a heatsink.

The terms "semiconductor diode lasers", "diode lasers", "diode laser", and "diode" are all meant to apply to a variety of diode laser sources 10 that may be implemented in a number of configurations. The diode lasers 10 may include a single diode 12 mounted down on a heatsink 14, as shown in FIG. 1. Such heatsinks 14 can be cooled via convection, by the incorporation of a thermoelectric cooler (TEC), or by the circulation of a flowing open or closed cycle cooling fluid such as air, water, a mixture of water and ethylene glycol, and liquid nitrogen or other cryogenic fluid.

Figure 2:
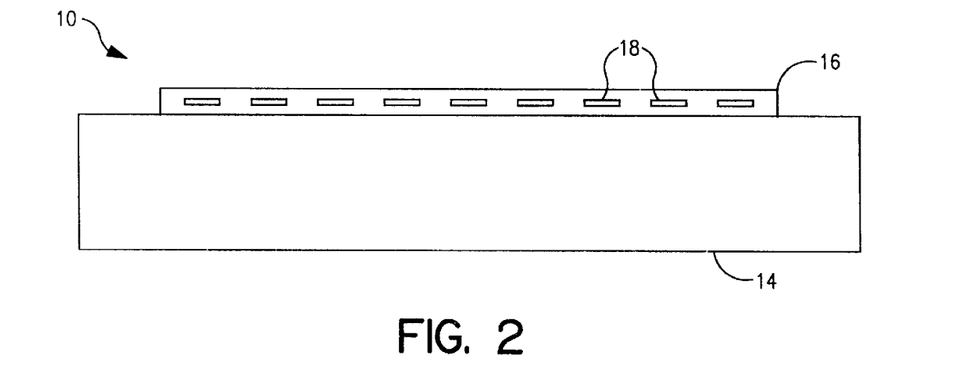
FIG. 2 is a schematic view of diode bar mounted to a heatsink.

Alternatively, the diode laser may include a diode bar 16, shown in FIG. 2, whose dimensions are typically 1 cm long, 0.4–1.2 mm long (the length of the semiconductor laser resonator), and 100–120 $\mu$m thick. The diode bar 16 contains typically 8–12 single diode emitters 18, and many more regions for pulsed or quasi-continuous wave operation with low duty cycle. The diode bar 16, or array, is mounted on a metallic (typically Cu or an alloy of Cu and W) or ceramic heatsink 14 (typically BeO) to effect heat removal. Heat removal is accomplished by use of any of the techniques already discussed with regard to mounting single diodes.

Figure 3:
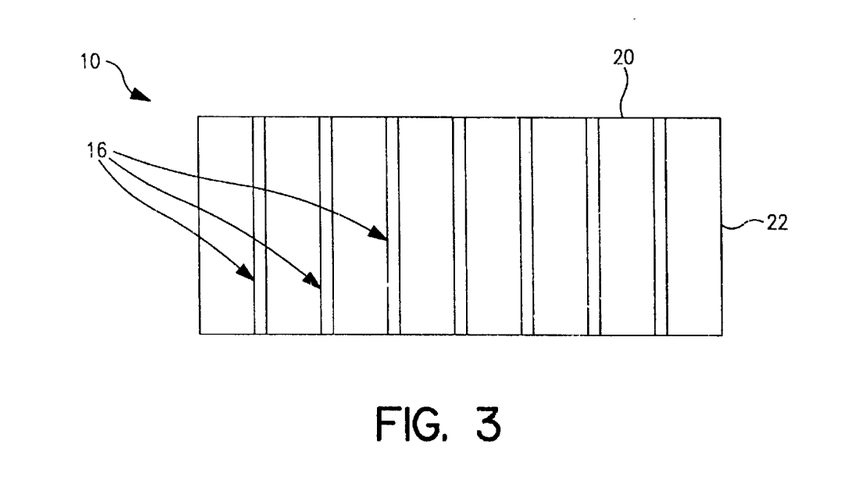
FIG. 3 is a schematic view of a two-dimensional diode array.

Yet another variant of the diode laser 10 is the diode array 20, 30 which refers to a stack of diode bars 16 that are assembled into two-dimensional arrays for the purpose of providing higher output power. Laser diode arrays 20 are available commercially from a number of sources in both continuous wave and quasi-continuous wave (pulsed) mode. An example is the bars in grooves technology shown in FIG. 3 where the diode bars 16 are soldered into long narrow grooves and are in intimate contact with a ceramic substrate 22, typically BeO. The BeO is in turn soldered to a metallic heat sink with a circulating fluid to remove heat generated by the array.

Figure 4:
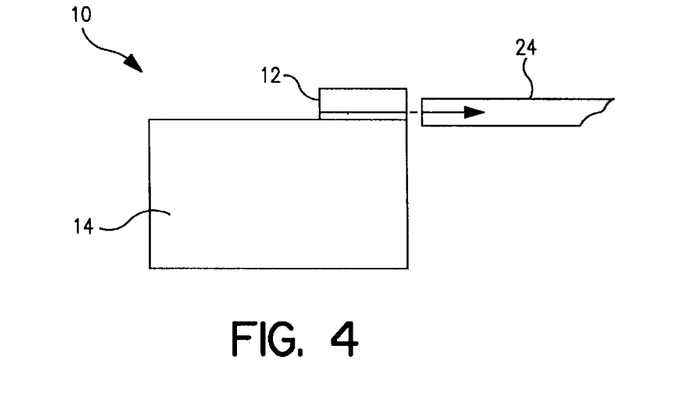
FIG. 4 is a schematic view of single diode laser butt-coupled to an optical fiber.
Figure 5:
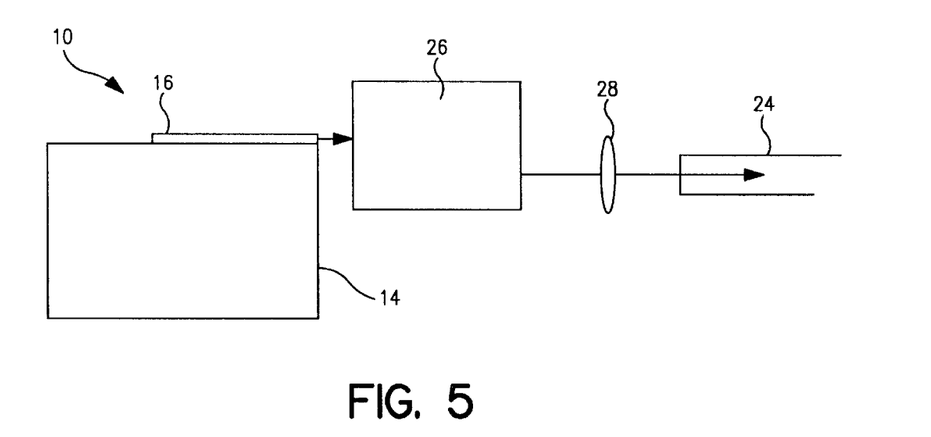
FIG. 5 is a schematic view of a diode bar coupled to an optical fiber.
Figure 6:
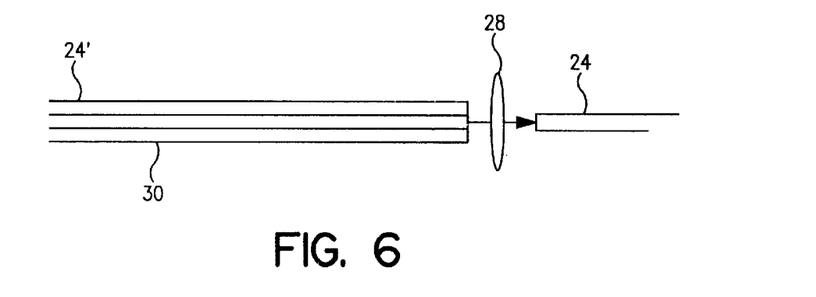
FIG. 6 is a schematic view of a multiple optical fiber source coupled to a single optical fiber.

Another form of the laser diode 10 is where one or more diodes 12 or bars are coupled to an optical fiber 24. An optical fiber typically consists of a solid central core surrounded by a cladding whose purpose is to confine the pump light to the inner core. Optical fibers have typically very low loss in the visible and near-infrared spectral regions out to about 3 $\mu$m. Fibers that transmit well in the region suitable for optical pumping $CO_2$ for example, around 4.3 $\mu$m, or generally at wavelengths longer than about 3 $\mu$m, are not currently available commercially. In such cases one may consider the use of hollow fibers or light pipes that have highly reflective internal walls as an alternative. In this patent disclosure the term "fiber" is meant to include solid or hollow fibers of any type and whose transmittance at the pump wavelength is acceptable. In FIG. 4 a single laser diode 12 is butt-coupled directly to an optical fiber 24. The coupling of the diode 12 to the fiber 24 may be performed by placing a fast-axis collimating lens at the output of the diode or by using a more complicated system utilizing aspheric lenses, cylinder lenses, and other elements. In FIG. 5, the output of a diode bar 16 is conditioned by any one of a number of optical beam forming systems 26 and is then focused using a lens 28 or a lens system into a single optical fiber 24. Optical fibers 24' may be coupled directly to one diode 12 and the output of a number of diode/fibers 24' may be drawn together to form a bundle 30, whose output can be used directly or is coupled to a single fiber 24 to provide a uniform homogenous output beam. This type of system is shown in FIG. 6 where multiple fibers 24', each coupled to a single diode or bar, are drawn into a bundle 30 and focused using an optical system or lens 28, into a single fiber 24.

Depending upon the laser output desired and the type of geometry chosen, any one of the previously discussed diode laser packages 10 can be used. Thus the term "semiconductor diode pumping" in this patent refers to the semiconductor diode system that is used, perhaps a single diode 12 directly coupled to the gas laser medium in one case, and a large high-power laser diode array 20 in another case. It should be appreciated that methods other than optical fibers 24 are available to collect and transport diode light to the laser gas 32, including beam ducts or direct coupling using conventional optics as discussed in the implementations below.

The laser gas 32 can contain one or more of the following gases or vapors: $CO_2$, $CO$, $N_2O$, $H_2O$, $D_2O$, $NH_3$, $HF$, $DF$, $HCl$, $HBr$, $Ar$, $Xe$, $Kr$, $CN$, $DBr$, $H_2$, $HD$, $D_2$, $N_2$, $CS_2$, $H_2S$, $OCS$, $SO_2$, $CH_3F$, $CH_3OH$, $I_2$, $Li$, $Na$, $Rb$, $Bi$, $Cu$, $Ca$, $Ba$, $Zn$, $Cd$, $Hg$, $Al$, $C$, $Ge$, $Sn$, $Sb$, $Tm$, $Cl$, $Br$, $Ne$, $Br_2$, $CdI$, $Li_2$, $Na_2$, $S_2$, $Se_2$, $TbAlCl$, $NdAlCl$, $NdI_3$, $TbI_3$, $Ndthd$, and $Tbthd$, $Ce$. In a preferred embodiment, the laser gas 32 is a diatomic or triatomic molecule which absorbs and lases in the NIR spectral region. $CO_2$ and $N_2O$ laser transitions in output bands centered around 10.3 and 10.5 $\mu$m respectively, see FIGS. 7 and 8. Laser diodes operating at 4.3 $\mu$m and 4.5 $\mu$m are near-optimum for pumping gas $CO_2$ and $N_2O$ lasers.

Figure 7:
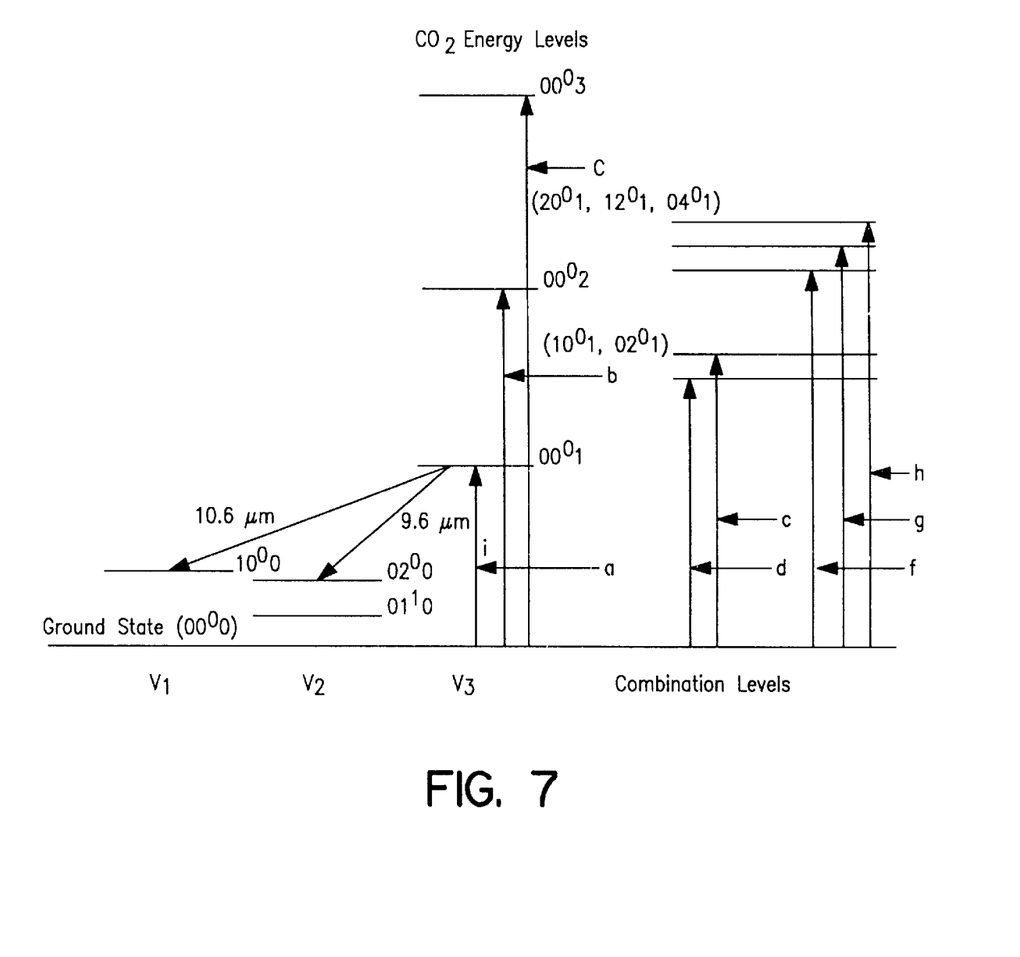
FIG. 7 is a graph of $CO_2$ energy levels.

$CO_2$ displays three fundamental vibrational bands in accordance with the three allowed vibrational modes of a linear triatomic molecule, labeled $v_1$, $v_2$ and $v_3$. For brevity, the corresponding rotational levels of $CO_2$ are not shown in FIG. 7. Laser emission in $CO_2$ occurs between the upper laser level ($00^01$) and the two lower or terminal levels $10^00$ and $02^00$ whose output emission is in bands in the vicinity of 10.6 and 9.6 $\mu$m respectively. Optical pumping of $CO_2$ can take place in direct schemes (a and b in FIG. 7) by absorption of a photon removing an electron from the ground state ($00^00$) to one of the $V_3$ vibrational levels $00^01$, $00^02$, or $00^03$. These absorptions correspond to wavelengths centered around 4.3, 2.7, and 1.4 $\mu$m respectively. The indirect or combination levels may also be pumped (d, e, f, g, h) at wavelengths between 1.96 and 2.77 $\mu$m. As shown in FIG. 7 the most optimum wavelength to optically pump $CO_2$ at is the 4.3 $\mu$m band since the quantum defect is the smallest, hence the maximum laser efficiency will be obtained.

Figure 8:
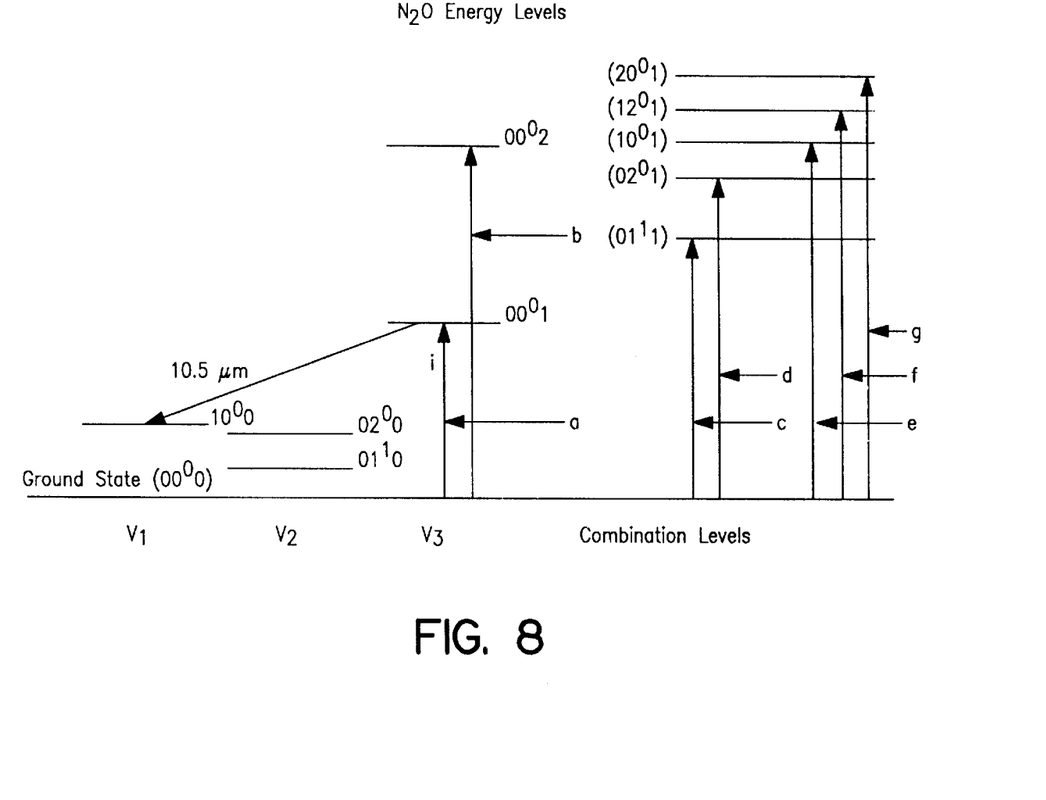
FIG. 8 is a graph of $N_2O$ energy levels.

For $N_2O$, shown in FIG. 8, the type of energy level structure is identical to that of $CO_2$; absorption from the ground state to the $00^01$ and $00^02$ levels is centered at wavelengths of 4.50 and 2.26 $\mu$m respectively. $N_2O$ emits in a single band centered around 10.50 $\mu$m. Pumping the 4.5 $\mu$m $N_2O$ band will provide the highest laser efficiency since the quantum defect is minimum for the associated transition.

It is apparent from an examination of FIGS. 7 and 8 that these gases may be optically-pumped with diode lasers to produce inversion between the $00^01$ upper laser level and the $10^00$ and $02^00$ lower laser levels in $CO_2$ and the $10^00$ level in $N_2O$. The lifetime of the upper laser level is long compared to the terminal level, thus ions can accumulate in the upper state, creating large population inversions. Because excited $N_2$ is not required to populate the $00^01$ state as would be the case in electrical discharge $CO_2$ lasers, a diode-pumped gas $CO_2$ laser would consist of $CO_2$ gas and a buffer or inert gas such as He, added to promote the depopulation of the $10^00$ lower laser level and increase the inversion density, or to broaden the absorption and emission lines. Other gases may be found to have a useful benefit on $CO_2$ laser performance and may also be added to the mixture. Direct transitions like a, b, and c in FIG. 7 and a and b in FIG. 8 have the largest absorption cross-sections. Transitions associated with the combination levels, (d, e, f, g, and h in FIG. 7 and c, d, e, f, and e in FIG. 8) have substantially weaker absorption cross-sections. The largest cross-section for $CO_2$ is associated with a in FIG. 7. For a $CO_2$ partial pressure of 1 atmosphere and with 9 atm He gas, for example, the absorption coefficient is 69/cm. Diode light incident upon $CO_2$ gas at 1 atm pressure would then be absorbed (1/e or 63%) in about 145 $\mu$m. For $N_2O$ the largest absorption also occurs for a in FIG. 8. The absorption coefficient at 4.5 $\mu$m has a value of 39/cm for 1 atm $N_2O$ and 4 atm He. Thus for $N_2O$ an incident diode beam with output at 4.5 $\mu$m would be absorbed (63%) in only 256 $\mu$m. Note that as discussed in the aforementioned, the deposition of power or the inversion density and gain will then be very inhomogenous, or non-uniform, as a function of the penetration depth.

As mentioned previously, the absorption in gases like $CO_2$ or $N_2O$ can be scaled according to $\alpha_p=\sigma_p n_D$, where $\alpha_p$ is the absorption coefficient (1/cm), $\sigma_p$ the absorption cross-section, and $n_D$ the gas density. Since unlike solid-state lasers it is relatively easy to change the partial pressure of the lasing gas, one can easily change the amount of diode absorption by changing the gas pressure. It is then possible to "tailor" the diode absorption to a given gas cell dimension by changing the gas pressure, or to change the cell dimension by adjusting the gas pressure accordingly.

Figure 9:
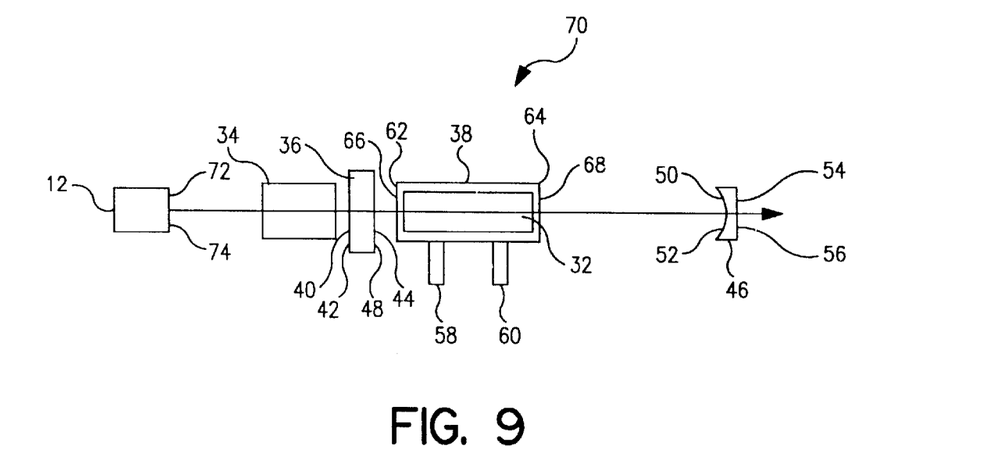
FIG. 9 is a schematic view of an end diode-pumped gas laser in accordance with the invention.

In FIG. 9, a single laser diode 12 whose output is focused, using diode focusing optics 34, through a high reflector 36 into the gas cell 38 where it is absorbed. The diode focusing optics 34 may consist of a simple lens, or an optical system which is highly astigmatic, into a tight spot in the gas cell. Diode lasers have an output that diverges rapidly in the fast axis perpendicular to the diode stripe, and relatively slowly in the parallel axis (the stripe or active region was shown in FIG. 1). The diode beam-quality is also near diffraction-limited in the fast axis and multi-mode in the slow axis.

The high reflector 36 is a dichroic element having a coating 40 on the side 42 of the high reflector 36 facing the diode 12 which is anti-reflective (AR) at the diode wavelength. The side 44 facing the outcoupler 46 has a coating 48 which is highly-transmissive (HT) for the diode output wavelength and also highly-reflective (HR) for the wavelength of the laser beam that will oscillate between the high reflector 36 and the outcoupler 46. The surface 50 of the outcoupler 46 facing the diode 12 has a coating 52 which is partially-reflective (PR) at the lasing wavelength to allow some of the resonator power to be coupled out; this coating 52 may also be PR or totally-reflective (TR) at the diode laser wavelength to allow the diode light to make a second pass of the gas medium and be more efficiently absorbed. The surface 54 of the outcoupler facing away from the diode has a coating 56 which is AR coated at the lasing wavelength.

The gas cell 38 contains the atomic or molecular lasing gas 32, any buffer or inert gases, or a metal vapor with or without another gas or gases (hereinafter the "gas"). The gas 32 may flow through the gas cell 38 via the inlet 58 and outlet 60 or may be static. For static conditions, the inlet 58 and outlet 60 may be sealed off. In general, low powers do not require flowing gas while higher powers do. The cell windows 62, 64 enclosing the gas are also AR coated 66, 68 on both faces at the laser wavelength. The coating 66 on the window 62 facing the diode laser 12 must also be AR at the diode wavelength for efficient coupling of the diode light to the gas. It should be realized that in some cases the cell windows 62, 64 may be replaced by the high reflector and outcoupler optics, effectively eliminating them. The optical resonator 70 formed by the high reflector 36 and outcoupler optics 46 is shown as being hemispherical or half-symmetric and is stable in the sense understood by laser physicists and engineers. It should be appreciated that the subject invention is not limited to the resonator 70 shown in FIG. 9 and that any type of resonator, including stable, unstable, VRM, astigmatic, telescopic, periodic, convex-convex, and other types may be utilized. The optical substrates from which the high reflector and outcoupler are made must be highly transmissive at the diode output and lasing wavelengths. A good example of such a material is ZnSe which has excellent transmission in the range from about 2–10.7 $\mu$m.

While FIG. 9 shows only a simple block to describe the diode laser 12, it is understood that the diode 12 includes the appropriate pulsed or continuous wave power supply as well as any cooling means needed to remove heat generated by or temperature tune the wave length of the diodes. The power supply may use batteries or AC or DC power. Similarly the gas cell 38 includes all supporting equipment needed including vacuum or flow pumps, heat exchangers, pipes or tubing, and gas reservoirs, filters, valves, or any other gas conditioning involved. Also included are any devices and materials needed to scrub or clean up contaminants in the gas 32.

A particularly important aspect of the end diode-pumping configuration shown in FIG. 9 is that by using the diode focusing system 34 the diode light can be made to more or less match the single or Gaussian transverse $TEM_{00}$ mode in the laser resonator. That is, by arranging for the diode light to pump gas 32 in the transverse and longitudinal extent of the $TEM_{00}$ mode, called mode-matching in the solid-state laser field, the laser can be forced to operate in a single transverse mode with at or near diffraction-limited beam-quality, and maximize the laser efficiency because gas atoms or molecules outside the single-mode are not pumped and wasted. Alternatively, one can pump the diode light into the window 62 or end facing the diode 12 and pump the entire volume of the gas cell 38, resulting in multi-mode output. In any case it should be noted that there will be a significant variation of population inversion both longitudinally and radially if the gas pressure is adjusted to absorb all the diode light after a single pass. This type of inversion profile, which peaks radially in the center of the resonator 70 and which varies strongly along the longitudinal axis, is common in solid-state diode-pumped lasers. It is not necessary to achieve a uniform longitudinal inversion density to obtain good efficiency and beam-quality. This feature clearly distinguishes the subject invention from the devices disclosed in U.S. Pat. Nos. 5,506,867 and 5,379,315.

It should also be appreciated that the diode 12, diode focusing optics 34, and resonator optics 36, 46 could also all be mounted on a baseplate and enclosed in an arbitrary box which is pressurized with the lasing gas 32. In that case, to avoid absorption in the gas 32 before it reaches the location where it is desired, the high reflector 36 would have to be placed in intimate contact with the diode laser output facet 72. Alternatively, a special coating 74 may be placed on the diode laser output facet 72 which is HT at the pump wavelength and also HR at the laser transition. This simple arrangement would require only one additional optic external to the diode 12, the outcoupler. One could also place a diode wavelength transmitting element 34 between the diode facet 72 and the high reflector 36.

Figure 10:
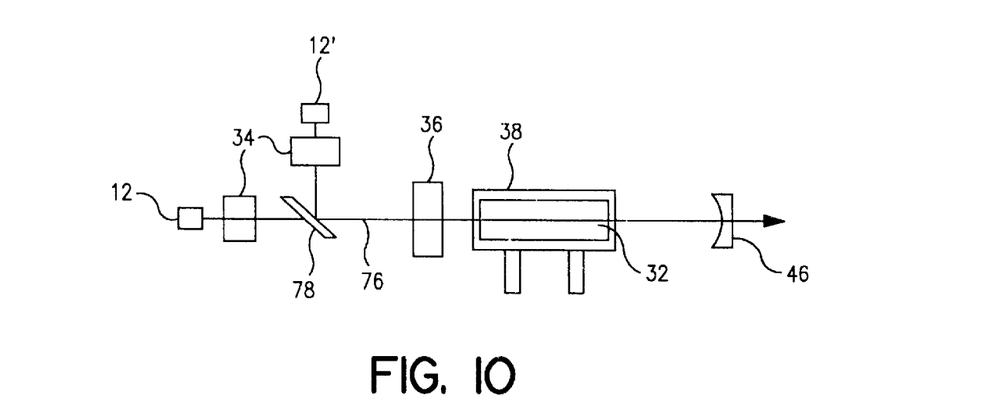
FIG. 10 is a schematic view of a polarization coupled end diode-pumped gas laser in accordance with the invention.

FIG. 10 shows an end diode-pumped gas laser that is identical to that shown in FIG. 9 except that two single diode lasers 12, 12' are used to optically-pump the gas 32 in the cell 38. Polarization coupling is used to combine the two diode beams into one. In FIG. 10, if the diode 12 in-line with the laser optical axis 76 has s polarization in the plane of the Figure so that it travels through the polarizer 78 with little attenuation, then the diode 12' arranged orthogonal to the optical axis 76 has p polarization and is totally reflected from the polarizer 78. The polarizer can be a Brewster type, thin-film polarizer, or other. All of the aforementioned comments made with respect to FIG. 9 also apply here.

Figure 11:
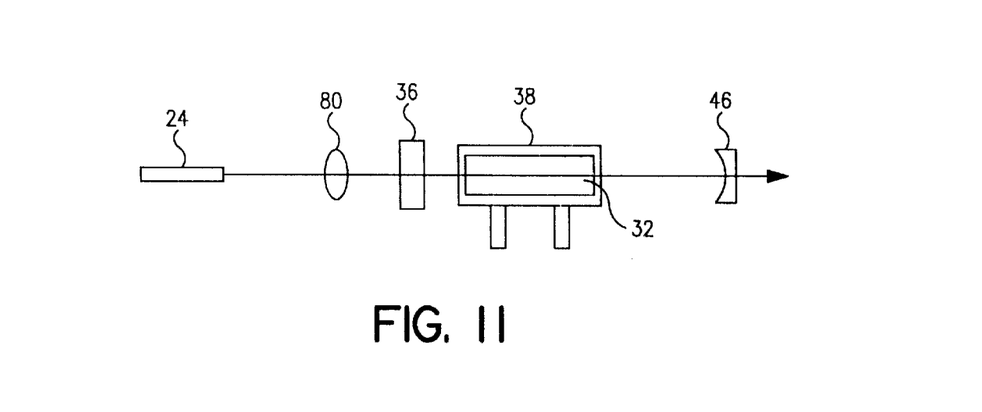
FIG. 11 is a schematic view of a fiber coupled end diode-pumped gas laser in accordance with the invention.

FIG. 11 shows an alternative pumping arrangement where the diode laser is replaced by a diode or diode-array fiber source where either one or a plurality of diode lasers are coupled to an optical fiber 24 by arbitrary means. This type of diode-fiber source was shown in FIGS. 5 and 6. A significant advantage of this type of optical pumping source is that the optical fiber 24 homogenizes the astigmatic output of the diode laser (or lasers), resulting in a beam emerging from the fiber that is nearly circularly symmetric. This type of source can be focused with spherical or aspherical optics 80 without the use of any astigmatic elements that make direct coupling of the laser diodes to the gas difficult and/or complicated. The configuration of FIG. 11 is identical to that of FIG. 9 and thus all of the aforementioned comments with respect to 9 also apply in this case.

Figure 12:
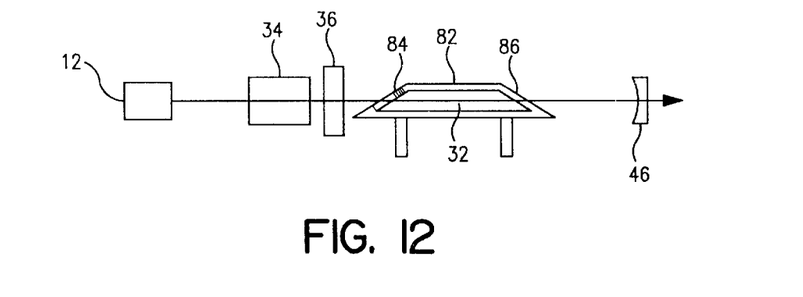
FIG. 12 is a schematic view of an end diode-pumped gas laser in accordance with the invention having a Brewster gas cell.

FIG. 12 shows a configuration which is similar to the configuration of FIG. 9, with the exception of the gas cell 82, where the AR coated input and output windows have been replaced by Brewster windows 84, 86 whose normal with respect to the system optical axis is set at Brewster's $\theta_B$ angle given by $$\theta_B = \tan^{-1}(n_0)$$

where $n_0$ is the linear refractive index of the window material. At Brewster's angle the reflective loss at each surface is zero for one polarization. Elimination of the loss associated with normal incidence or near-normal incidence gas cell windows is very important for low-gain continuous wave lasers to achieve the maximum laser efficiency. The gas cell Brewster windows 84, 86 may be parallel or opposed.

Figure 13:
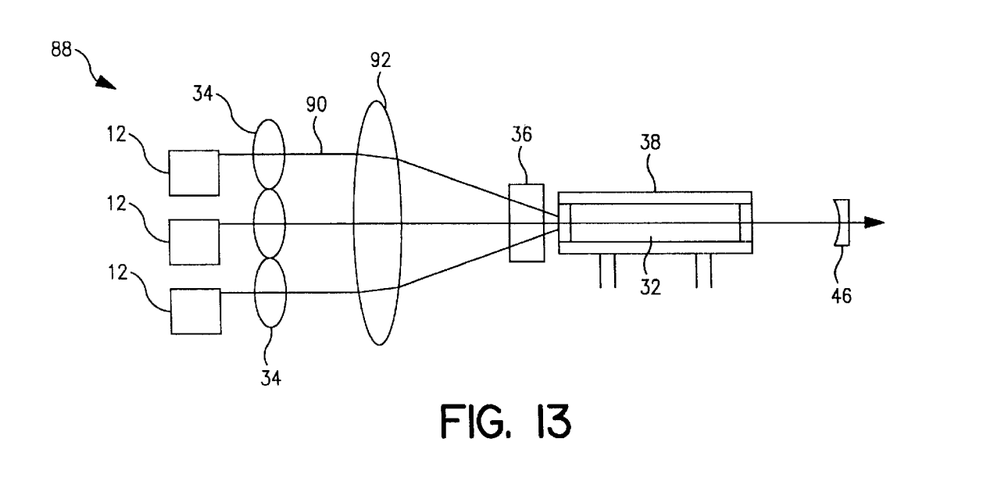
FIG. 13 is a schematic view of a vertically stacked end diode-pumped gas laser in accordance with the invention.

Another configuration, shown in FIG. 13, utilizes multiple diodes that are vertically stacked to form an array 88. Vertically stacked means in the direction of the diode fast axis in which the beam-quality of the diode laser is the best. By stacking a number N of diodes 12, the power output is increased by N but the beam-quality in the fast-axis direction is also degraded roughly N times. If enough diodes 12 are stacked one can arrive at a situation where the equivalent fast-axis beam-quality is roughly equal to the slow axis beam-quality. Upon focusing the resulting composite beam 90 down into the gas cell 38 with a lens 92, the resulting configuration pumps with N times greater power than a single diode, and because the beam-qualities are nearly equal, also provides a near-symmetric focused spot in the gas 32. With the exception of the new laser diode arrangement, this laser is identical to FIG. 9 and all of the previous comments made regarding that system also apply here.

Figure 14:
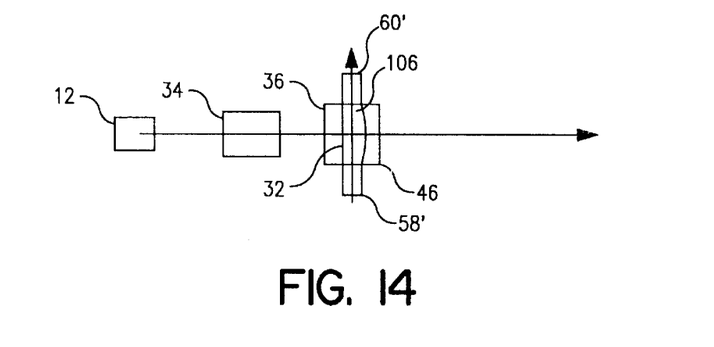
FIG. 14 is a schematic view of an end diode-pumped gas laser in accordance with the invention having flowing gas.
Figure 15:
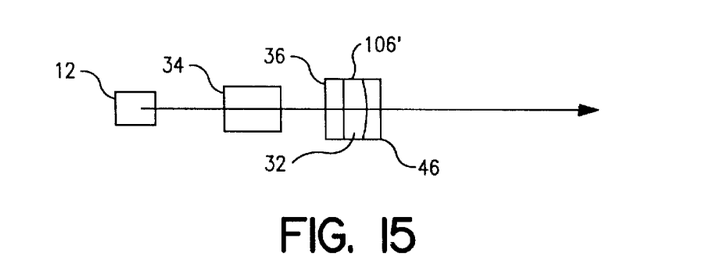
FIG. 15 is a schematic view of an end diode-pumped gas laser in accordance with the invention having static gas.

Focusing a common diode beam into the end of a gas cell results in a minimum waist or beam diameter, arranged to typically be directly adjacent to the gas cell window. After passing through the focus or minimum beam size the beam again diverges in general differently in the diode fast and slow axes, at rates which are determined by the beam-quality of the laser diode beam in each axis. A measure of the beam-quality is the Rayleigh range, formally equal to the longitudinal distance over which the beam minimum spot size varies in back of and forward of the focal spot by the square root of 2. The Rayleigh range for commonly available commercial diode lasers is typically measured in mm's. In some situations, for example where it is desirable to match the pumping mode to the fundamental $TEM_{00}$ resonator mode, it is then desirable to have a short cell length. An example of this is shown in FIG. 14 where a thin gas cell 106 is formed by moving the high reflector 36 and outcoupler 46 very close together. The absorbing gas pressure is then adjusted so that all of the diode light is absorbed after a single pass, or at most two passes of the thin cell region. In the implementation shown in FIG. 14 the gas may be flowed to remove excess heat, an important consideration if high pump and lasing power densities are to used. In the case where only low average power is required, a closed cell like that shown in FIG. 15 can be used. Both FIGS. 14 and 15 have most features in common with the previously described FIG. 9 with the exceptions that the gas cell is now thin and the gas may or may not be flowed.

Figure 16:
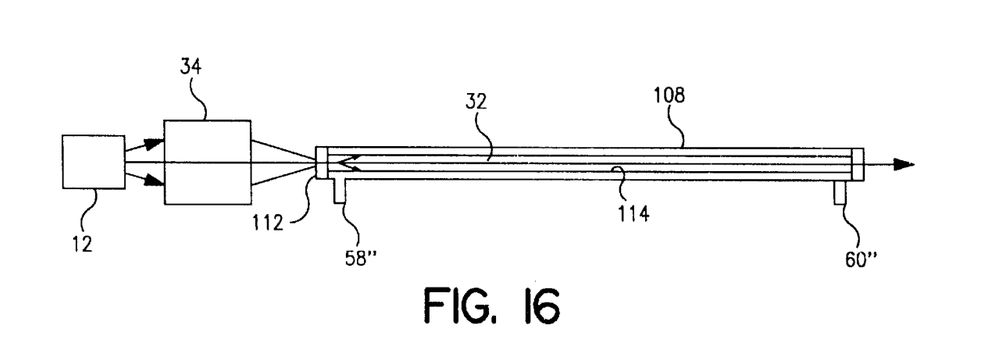
FIG. 16 is a schematic view of an end diode-pumped waveguide gas laser in accordance with the invention.

FIG. 16 shows a waveguide laser. The long narrow gas filled tube 108 with mirrors (which may be curved or flat) on either end constitutes a simple waveguide laser where the waveguide propagation modes and the resonator modes are the same. By choice of the waveguide diameter a low-loss transverse $EH_{11}$ linearly polarized mode can be produced with characteristics close to that of the fundamental Gaussian $TEM_{00}$ mode found in open resonators. This implementation has a number of desirable features, for example the tube 108 can be fabricated using either glass, ceramics or hollow optical fiber. By focusing the diode output into the end of the tube through the dichroic high reflector 112, rays can be trapped inside the tube by total-internal-reflection (TIR) or by reflection from the inside surface material 114 with a large reflection coefficient at the pump diode wavelength. TIR takes place in dielectric media where the angle of incidence θ on the tube surface, with respect to the surface normal, exceeds the critical angle $\theta_c$ which is calculated from the relationship $$\theta_c = \sin^{-1}(n_1/n_2)$$

where $n_1$ and $n_2$ are the linear indices of refraction of the gas 32 and the dielectric tube 108 respectively.

Figure 17:
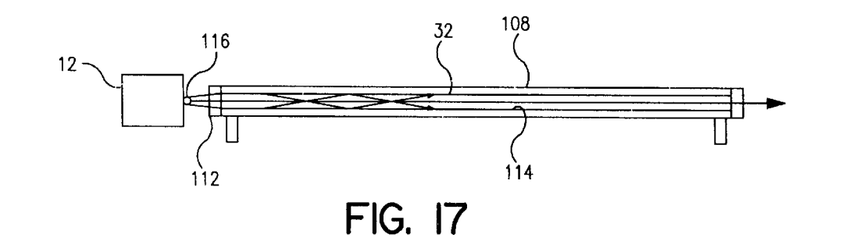
FIG. 17 is a schematic view of an end diode-pumped waveguide gas laser in accordance with the invention which does not have diode focusing optics.

By use of either one of these effects, most of the diode light is trapped in the long tube, has a substantially longer absorption distance than for straight-through propagation, and can be efficiently utilized. Rather than using diode focusing optics, in some cases it may be desirable to butt-couple a diode or the tip of an optical fiber close to or directly adjacent to the high reflector as shown in FIG. 17. The major advantage here is that losses due to the diode focusing system are eliminated and higher laser efficiency results. For good efficiency a diode fast axis collimating or near-collimating lens 116 is often attached just beyond the diode emitting facet as shown in FIG. 17. It should be noted that this patent disclosure includes waveguides of arbitrary cross-section and dimensions.

Figure 18:
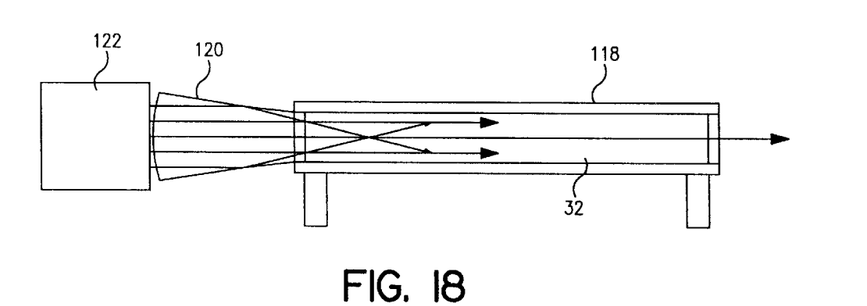
FIG. 18 is a schematic view of an end diode-pumped gas laser in accordance with the invention having a diode array and bean duct.

For end-pumped configurations where the diameter of the gas tube 118 is larger than that characteristic of waveguide lasers, the arrangement shown in FIG. 18 can be used. Three-dimensional beam ducts 120 may be used to end diode-pump solid-state lasers, and can be used to concentrate and homogenize the output from a diode-array 122 with an output area larger than the diameter of the gas cell 118 to a dimension close to that of the gas cell 118.

Figure 19:
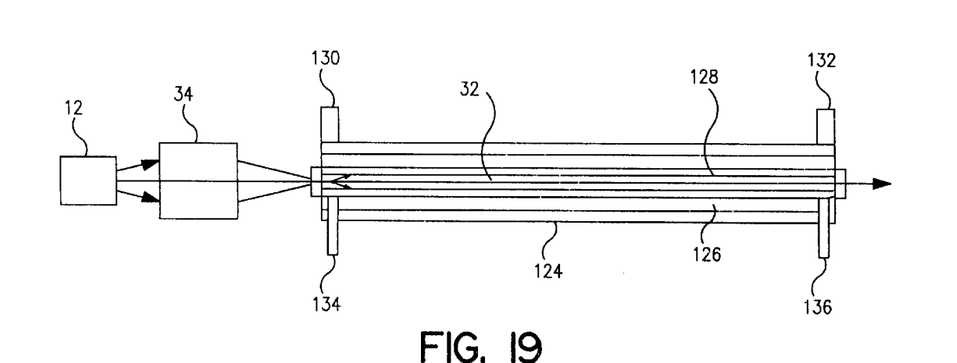
FIG. 19 is a schematic view of an end diode-pumped gas laser in accordance with the invention having fluid cooling.

End diode-pumped gas lasers can also be actively cooled with a separate fluid such as air, water, or liquid nitrogen via a fluid inlet 130 and a fluid outlet 132, if so desired. This technique, shown in FIG. 19 is useful for static closed gas cells. The cooling fluid 126 is contained between the outer and inner tubes 124, 128. For end-diode-pumping the tubes 124, 128 can be opaque and may, for example, use high-thermal conductivity metals with cooling fluid passages. For static gas cells of course the gas inlet 134 and outlet 136 would be sealed off.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An end-pumped diode-pumped gas laser comprising:
   a source of optical diode-pumping light, the diode-pumping light having a bandwidth defining a center wavelength;
   a gas cell having a first optical window for receiving the diode-pumping light and a second optical window for transmitting a laser light having a wavelength;
   a laser gas disposed within the gas cell, the laser gas comprising a lasing gas having at least one absorbing and lasing atomic or molecular gas having an optical absorption band, the bandwidth of the diode-pumping light at least partially overlapping the absorption band of the lasing gas;
   gas laser resonator means for providing an output laser beam having one or more laser wavelengths, the gas laser resonator means having a fundamental $TEM_{00}$ mode volume distribution;
   diode optics means for directing the diode-pumping light through the first optical window, the diode optic means being adapted and configured to couple the diode-pumping light directly into the lowest order fundamental $TEM_{00}$ mode of the gas laser resonator means; and
   a heat power regulation system for regulating the temperature of the source of optical diode-pumping light.

2. The gas laser of claim 1 wherein the lasing gas is selected from the group consisting of atomic gas, molecular gas, atomic vapor, and molecular vapor.

3. The gas laser of claim 1 wherein the laser gas is a mixture of the lasing gas, a second absorbing gas whose excitation energy is transferred to the lasing gas, and one or more inert gases.

4. The gas laser of claim 1 wherein the laser gas further comprises an atomic or molecular gas added to act as a saturable absorber or laser frequency converter.

5. The gas laser of claim 1 wherein the lasing gas is selected from the group consisting of $CO_2$, $CO$, $N_2O$, $H_2O$, $D_2O$, $NH_3$, $HF$, $DF$, $HCl$, $HBr$, $Ar$, $Xe$, $Kr$, $CN$, $DBr$, $H_2$, $HD$, $D_2$, $N_2$, $CS_2$, $H_2S$, $OCS$, $SO_2$, $CH_3F$, $CH_3OH$, $I_2$, $Li$, $Na$, $Rb$, $Bi$, $Cu$, $Ca$, $Ba$, $Zn$, $Cd$, $Hg$, $Al$, $C$, $Ge$, $Sn$, $Sb$, $Tm$, $Cl$, $Br$, $Ne$, $Br_2$, $CdI$, $Li_2$, $Na_2$, $S_2$, $Se_2$, $TbAlCl$, $NdAlCl$, $NdI_3$, $TbI_3$, Ndthd, and Tbthd, Ce.

6. The gas laser of claim 1 wherein the first and second optical windows are normal incidence or near normal incidence optical windows, each of the windows having inside and outside surfaces and a coating which is anti-reflective at the wavelength of the laser light, the outside and inside surfaces of the first optical window having a coating which is anti-reflective at the wavelength of the diode-pumping light.

7. The gas laser of claim 1 wherein the first and second optical windows are Brewster angle optical windows.

8. The gas laser of claim 1 wherein the first optical window is highly transmissive at the center wave length and is a high reflector at the wave length of the laser light and the second optical window is an outcoupler.

9. The gas laser of claim 1 wherein the gas cell is composed of a material which is transparent at the wavelength of the diode-pumping light.

10. The gas laser of claim 1 wherein the gas cell further has inner and outer coaxial tubes and a coolant liquid disposed within the outer tube, the laser gas being disposed within the inner tube.

11. The gas laser of claim 1 wherein the gas cell comprises a laser waveguide.

12. The gas laser of claim 1 wherein the gas cell has an internal surface and a coating disposed on the internal surface which is highly-reflective at the center wavelength.

13. The gas laser of claim 1 wherein the laser gas has a pressure and the gas laser further comprises means for adjusting the pressure of the laser gas wherein the absorption of the diode-pumping light is adjusted.

14. The gas laser of claim 1 wherein the gas laser resonator comprises a high reflector and an outcoupler, the high reflector having input face adjacent the source of optical diode-pumping light and an output face adjacent the gas cell, the outcoupler having in input face adjacent the gas cell and an oppositely disposed output face, the input face of the high reflector having a coating which is anti-reflective at the center wavelength, the output face of the high reflector having a coating which is highly-transmissive at the center wavelength and highly reflective at the wavelength of the laser light, the input face of the outcoupler having a coating which is partially-reflective at the wavelength of the laser light, the output face of the outcoupler having a coating which is anti-reflective at the wavelength of the laser light.

15. The gas laser of claim 1 wherein the gas laser resonator comprises a high reflector and an outcoupler, the high reflector having input face adjacent the source of optical diode-pumping light and an output face adjacent the gas cell, the outcoupler having in input face adjacent the gas cell and an oppositely disposed output face, the output face of the high reflector having a coating which is highly-reflective at the wavelength of the laser light, the input face of the high reflector having a coating which is highly transmissive at the center wave length, the input face of the outcoupler having a coating which is partially-reflective at the wavelength of the laser light, the output face of the outcoupler having a coating which is anti-reflective at the wavelength of the laser light.

16. The gas laser of claim 1 wherein the gas laser resonator comprises an internal aperture.

17. The gas laser of claim 1 wherein the gas laser resonator comprises an outcoupler composed of a substrate material which is highly-transmissive at the wavelength of the laser light and a high reflector composed of a substrate material which is highly-reflective at the center wavelength.

18. The gas laser of claim 1 wherein the gas laser resonator comprises means for adjusting the performance of the gas laser selected from the group consisting of means for affecting the temporal performance of the laser, means for tuning the laser output, means for converting the laser output to a different frequency, and means for phase-conjugating the laser to remove aberrations.

19. The gas laser of claim 1 wherein the diode optics means is selected from the group consisting of low loss optics, individual spherical lenses, individual cylinder lenses, aspherical lenses, ball lenses, grin lenses, fiber lenses, microscope objectives, diffractive lenses, flat reflective optical surfaces, curved reflective optical surfaces, solid optical fibers, hollow optical fibers, and gas-filled optical fibers.

20. The gas laser of claim 1 wherein the gas cell is composed of a material which is absorbent at the wavelength of the laser light and transmissive at the center wavelength.

21. The gas laser of claim 1 wherein the gas cell has a coating which is anti-reflective at the wavelength of the laser light to eliminate reflections of laser wavelength.

22. The gas laser of claim 1 wherein the gas laser resonator is selected from the group of consisting of stable resonators, unstable resonators, VRM unstable resonators, astigmatic resonators, telescopic resonators, convex-convex resonators, and periodic resonators.

23. The gas laser of claim 1 wherein the gas cell has a gas gain volume resulting from the diode-pumping light, the gas gain volume being closely matched to the fundamental $TEM_{00}$ mode volume distribution.

24. The gas laser of claim 2 wherein the laser gas is a mixture of the lasing gas and at least one inert gas.

25. The gas laser of claim 2 wherein the laser gas is a mixture of the lasing gas and a second absorbing gas whose excitation energy is transferred to the lasing gas.

26. The gas laser of claim 17 wherein the substrate material of the outcoupler and high reflector is selected from the group consisting of $SiO_2$, BK-7, clear diamond, sapphire, and ZnSe.

27. A diode-pumped gas laser comprising:

a source of optical diode-pumping light, the diode-pumping light having a bandwidth defining a center wavelength;

a gas cell having a first optical window for receiving the diode-pumping light, a second optical window for transmitting a laser light having a wavelength, a gas inlet and a gas outlet;

a laser gas disposed within the gas cell, the laser gas comprising a lasing gas having at least one absorbing and lasing atomic or molecular gas having an optical absorption band, the bandwidth of the diode-pumping light at least partially overlapping the absorption band of the lasing gas;

gas laser resonator means for providing an output laser beam having one or more laser wavelengths, the gas laser resonator means having a fundamental $TEM_{00}$ mode volume distribution;

diode optics means for directing the diode-pumping light through the first optical window, the diode optic means being adapted and configured to couple the diode-pumping light directly into the lowest order fundamental $TEM_{00}$ mode of the gas laser resonator means; and a gas flow system in fluid communication with the gas inlet and the gas outlet of the gas cell.

* * * * *

UNITED STATES PATENT AND TRADEMARK OFFICE
CERTIFICATE OF CORRECTION

PATENT NO.   : 6,331,993 B1  Page 1 of 1
DATED        : December 18, 2001
INVENTOR(S)  : Brown It is certified that error appears in the above-identified patent and that said Letters Patent is hereby corrected as shown below:

<u>Column 12,</u>
Line 17, change "NII$_3$, IIF, DF, IICL, IIBr, Ar, Xe, Kr, CN, DBr, II$_2$, IID" to -- NH$_3$, HF, DF, HCL, HBr, Ar, Xe, Kr, CN, DBr, H$_2$, HD --

Signed and Sealed this

Twenty-sixth Day of November, 2002

*Attest:*

*Attesting Officer*

JAMES E. ROGAN
*Director of the United States Patent and Trademark Office*